Dec. 10, 1963
M. HĂNGĂNUTIU ETAL
STATIC REACTOR AND PLANT FOR ELECTRIC-ARC
CRACKING OF HYDROCARBONS
Filed Feb. 12, 1960
3,113,919
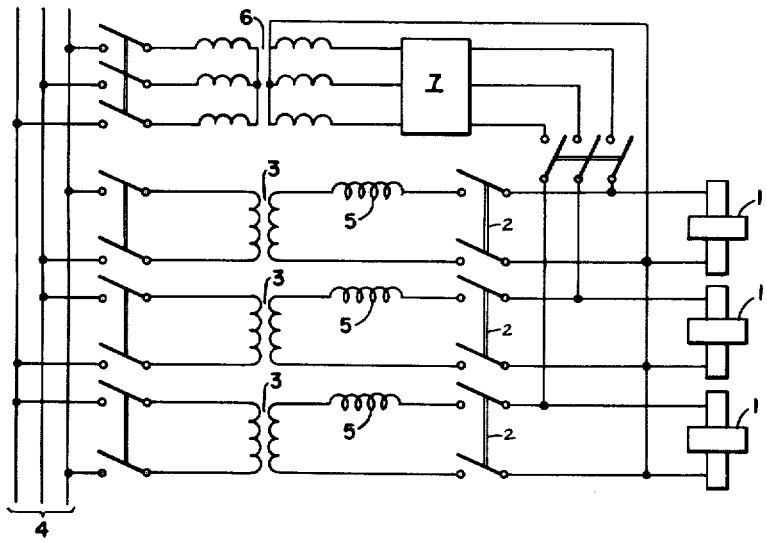
FIG.1.
FIG.2.
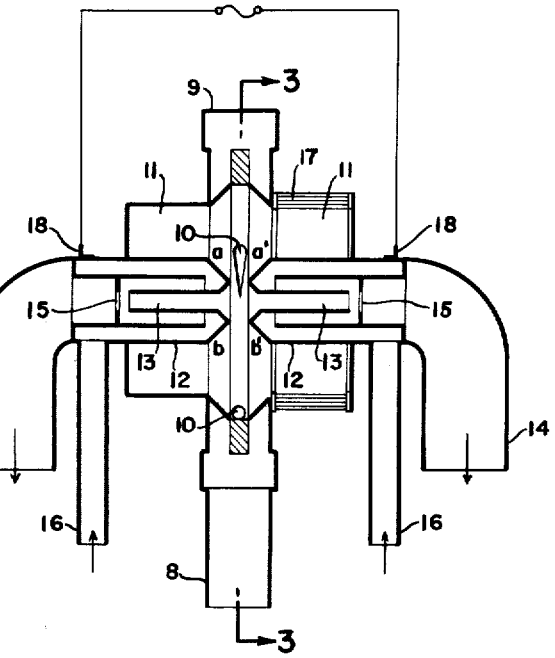
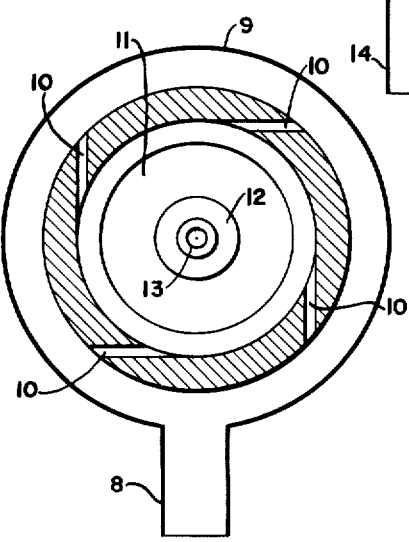
FIG.3.

United States Patent Office 3,113,919
Patented Dec. 10, 1963

3,113,919
STATIC REACTOR AND PLANT FOR ELECTRIC-ARC CRACKING OF HYDROCARBONS
Marius Hăngănutiu, Bucharest, and Dumitru Tănăsescu, Risnov, Rumania, assignors to Ministerul Industriel Petrolului Si Chimiei, Bucharest, Rumania
Filed Feb. 12, 1960, Ser. No. 8,371
4 Claims. (Cl. 204—328)

This invention relates to a static reactor and plant particularly for the cracking of hydrocarbons by an electric arc.

In apparatus for electrical cracking of hydrocarbons intended for acetylene production, static reactors are known to operate on direct current and to preheat gaseous hydrocarbons, either pure or mixed with finely divided liquid hydrocarbons, to temperatures ranging from about 10 to 100° C. The drawbacks of such a reactor consist in the use of direct current and the impossibility of handling gaseous hydrocarbons preheated to temperatures above 100° C.

An object of the present invention is to provide a static reactor and a plant for cracking hydrocarbons by electric arc, which operates on A.C., and avoids the drawbacks of conventional reactors.

The reactor covered by this invention is supplied with single-phase A.C., the voltage being applied to two electrodes facing each other and provided with axial bores. The front surface of the electrodes is machined so that the gas flow is directed to a narrow gap designed to ensure proper striking of the arc, the said gap increasing toward the electrode axis in order to allow arc spreading into the axial bores.

The two identical electrodes are symmetrically placed to each other allowing a non-preferential gas flow. To ensure a sudden cooling of the cracked gases, the electrodes are provided downstream with axial bores into which great quantities of water are injected. The electrodes themselves are water-cooled, the water flowing through channels provided for that purpose within their bodies.

Gases are supplied to the reactor by a ring-shaped distribution chamber from which there are discharged through several nozzles located in the plane of symmetry of the electrodes and positioned to generate a steady whirling of the gas that flows through the narrow striking gap. A surge chamber, connected to the ring-shaped distribution chamber, ensures steady flow conditions between the electrodes.

The reactor is built of materials corresponding to its operation on gases supplied at temperatures ranging from 500 to 700° C., which temperatures are utilized in order to increase the thermodynamic efficiency of the hydrocarbon cracking process by using pre-heated hydrocarbons.

The plant for electric-arc cracking of hydrocarbons, covered by this invention, consists of a group of three identical reactors, connected by balanced circuits to a three-phase supply system and provided with apparatus for striking the arc at every half-period by means of a higher-voltage impulse wave capable to cause an independent discharge between the electrodes and equipped with means for varying the phase-angle relative to the reactor supply voltage in order to ensure optimum operation. It is understood that the apparatus for striking the arc by impulses, as well as the reactors, are connected to the same supply system.

Additional advantages of the present invention will become apparent from the following description of a preferred embodiment shown by way of illustration in the accompanying drawings wherein:

FIG. 1 is a schematic wiring diagram of a plant for cracking hydrocarbons constructed and arranged according to the invention;

FIG. 2 is a semi-diagrammatic longitudinal section through one of the reactors illustrated in FIG. 1; and FIG. 3 is a cross-section of the reactor shown in FIG. 2, taken on the line 3—3 thereof.

The plant for electric-arc cracking of hydrocarbons, as illustrated in FIG. 1, comprises three reactors 1, to which voltage is individually supplied through respective switches 2 and single-phase transformers 3 from a three-phase electrical transmission line generally designated by the reference numeral 4 and controlled by main switching means; choking coils 5 are connected in series with each reactor 1 and its corresponding transformer 3. A separate three-phase transformer 6, suitably connected to the transmission line 4, applies additional single-phase voltage to the respective reactors 1 through a phase lagging apparatus 7, the output of which is connected across the respective reactor leads between the respective single phase transformers 3 and the reactors 1; the additional single-phase voltage is supplied as impulses.

The detailed construction of one reactor 1 according to the invention is illustrated in the semi-diagrammatical sectional views shown in FIGS. 2 and 3. In these views, a gas delivery pipe 8 is connected to a ring-shaped outer distribution chamber 9 for delivering the gas to be cracked. Gas nozzles 10 are formed in an inner wall of the gas distribution chamber which surrounds a surge chamber 11, constituting the central chamber of the reactor. The surge chamber 11 houses the electrodes 12 of the reactor. The gas nozzles 10 extend tangentially to the axis of the ring-shaped outer distribution chamber 9 and the surge chamber 11, in order to generate a constant whirling of the gas entering the surge chamber.

As illustrated in FIG. 2, the electrodes 12 are separated, as between $a$—$a$ and $b$—$b'$, by a narrow gap of uniform extent into which the nozzles 10 discharge. A steady gas flow is obtained in the surge chamber, so that the gas whirling in the narrow gap between the electrodes $a$—$a'$ and $b$—$b'$ is also uniform.

The electrodes 12 are formed with axial bores 13 therein where the gaseous hydrocarbons are cracked and through which the reaction gases leave the reactor to follow the outlets 14. The electric arc struck in the narrow gap is spread by the gas stream along the axial bores 13 of the electrodes.

The design of the reactor is symmetrical relative to section line 3—3 and ensures an equal gas flow in both parts of the reactor. The reaction gases leaving the axial bores 13 are immediately cooled by water-spraying at slot 15 formed in plates positioned transversely between the downstream ends of the axial bores 13 of the electrodes and the upstream ends of the outlets 14, through which they are discharged. In the design shown in FIG. 2, the electrodes 12 are cooled by water supplied through ports 16, serving also for cooling the gases. The electrodes 12 are insulated by ceramic insulating rings 17 which are disposed around the outer surface of each electrode. The electrodes are provided with terminals 18 whereby the reactor is connected to the power supply.

From the above arrangement, it is apparent that the present invention results in many advantages and particularly the advantage that it is now possible to use alternating current for static reactors resulting in simple, economical electric systems, and the advantage that it is now possible to use gaseous hydrocarbons or liquid hydrocarbons partly cracked and mixed with gaseous hydrocarbons, all of which are preheated resulting in a considerable reduction of the power input required by the arc.

Inasmuch as only one embodiment of the present invention is shown and described herein and is subject to many variations, modifications and changes in construction, it is intended that all matter contained in the foregoing description or shown on the accompanying drawing, shall be interpreted as illustrative and not in a limiting sense.

What is claimed is:

1. A static reactor for electric arc-cracking of hydrocarbons comprising two coaxial, opposed electrodes disposed to provide a narrow gap between their adjacent ends, each of said electrodes having therein an axial bore extending through and away from its end adjacent the end of the other electrode and expanding into the gap between said electrodes, the axial bore of each electrode expanding within the electrode at a distance from the gap between said electrodes, tangentially directed nozzles for injecting a constant swirl of gaseous hydrocarbons to be cracked through the gap between the adjacent ends of the electrodes and into the axial bores of the electrodes, outlets for withdrawing the cracked hydrocarbons from the ends of said electrodes distant from the gap therebetween, means for water-cooling said electrodes, a plate positioned transversely within the expanded axial bore of each electrode and upstream from the respective outlet, each plate having a slot formed therein for spraying water into the bore of each electrode to thereby suddenly cool the cracked hydrocarbons being discharged through the outlets, and means for supplying single-phase A.C. across said electrodes to strike an electric arc within the gap therebetween.

2. A static reactor as claimed in claim 1 wherein a cylindrical surge chamber encloses at least a part of both of said electrodes and the gap between said electrodes, and said nozzles inject the gaseous hydrocarbons in a swirl into said surge chamber.

3. A static reactor as claimed in claim 2 wherein a cylindrical distribution chamber surrounds said surge chamber to supply steady flow of the gaseous hydrocarbons therefrom through said nozzles into said surge chamber.

4. A static reactor as claimed in claim 2 wherein said two electrodes are identically designed and symmetrically disposed with respect to one another whereby an equal gas flow is provided in both parts of the reactor.

References Cited in the file of this patent

UNITED STATES PATENTS

| | | |
|---|---|---|
| 1,028,516 | Wielgolaski et al. | June 4, 1912 |
| 1,193,882 | Edwin | Aug. 6, 1916 |
| 1,263,533 | Currie | Apr. 23, 1918 |
| 1,650,072 | Jonas et al. | Nov. 22, 1927 |
| 1,781,826 | Thomas | Nov. 18, 1930 |
| 2,167,976 | Hanson | Aug. 1, 1939 |
| 2,441,056 | Becker | May 4, 1948 |
| 2,587,331 | Jordan | Feb. 26, 1952 |
| 2,951,143 | Anderson | Aug. 30, 1960 |

FOREIGN PATENTS

| | | |
|---|---|---|
| 56,096 | Sweden | Feb. 26, 1924 |
| 587,129 | Germany | Oct. 30, 1933 |

UNITED STATES PATENT OFFICE
CERTIFICATE OF CORRECTION

Patent No. 3,113,919                   December 10, 1963

Marius Hăngănutiu et al.

It is hereby certified that error appears in the above numbered patent requiring correction and that the said Letters Patent should read as corrected below.

In the grant, lines 2 and 3, and line 12, and in the heading to the printed specification, lines 5 and 6, for "Ministerul Industriel Petrolului Si Chimiel", each occurrence, read -- Ministerul Industriei Petrolului Si Chimiei --.

Signed and sealed this 5th day of May 1964.

(SEAL)
Attest:

ERNEST W. SWIDER                         EDWARD J. BRENNER

Attesting Officer                           Commissioner of Patents